(No Model.) 12 Sheets—Sheet 1.
D. PEREZ Y BUÑOL.
MACHINE FOR MAKING CIGARETTE BOXES AND PACKING CIGARETTES.

No. 579,038. Patented Mar. 16, 1897.

Fig. 1.

WITNESSES: H. Walker, John Lotka

INVENTOR: D. Perez y Buñol
BY [signature]
ATTORNEYS.

(No Model.)

D. PEREZ Y BUÑOL.
MACHINE FOR MAKING CIGARETTE BOXES AND PACKING CIGARETTES.

Patented Mar. 16, 1897.

Fig. 4.

WITNESSES:
H. Walker
John Lotka

INVENTOR
D. Perez y Buñol.
BY
ATTORNEYS.

(No Model.)  12 Sheets—Sheet 5.

D. PEREZ Y BUÑOL.
MACHINE FOR MAKING CIGARETTE BOXES AND PACKING CIGARETTES.

No. 579,038. Patented Mar. 16, 1897.

WITNESSES:
H. Walker
John Lotka

INVENTOR
D. Perez y Buñol.
BY
ATTORNEY.

(No Model.) 12 Sheets—Sheet 6.

D. PEREZ Y BUÑOL.
MACHINE FOR MAKING CIGARETTE BOXES AND PACKING CIGARETTES.

No. 579,038. Patented Mar. 16, 1897.

WITNESSES:
H. Walker
John Lotka

INVENTOR
D. Perez y Buñol.
BY
ATTORNEYS.

(No Model.) 12 Sheets—Sheet 7.

D. PEREZ Y BUÑOL.
MACHINE FOR MAKING CIGARETTE BOXES AND PACKING CIGARETTES.

No. 579,038. Patented Mar. 16, 1897.

WITNESSES:
H. Walker
John Lotta

INVENTOR
D. Perez y Buñol.
BY
ATTORNEYS.

(No Model.) 12 Sheets—Sheet 8.
D. PEREZ Y BUÑOL.
MACHINE FOR MAKING CIGARETTE BOXES AND PACKING CIGARETTES.
No. 579,038. Patented Mar. 16, 1897.

WITNESSES:
H. Walker
John Lotka

INVENTOR
D. Perez y Buñol.
BY
ATTORNEYS.

(No Model.) 12 Sheets—Sheet 10.
D. PEREZ Y BUÑOL.
MACHINE FOR MAKING CIGARETTE BOXES AND PACKING CIGARETTES.

No. 579,038. Patented Mar. 16, 1897.

WITNESSES:
H. Walker
John Lotka

INVENTOR
D. Perez y Buñol
BY
ATTORNEYS.

UNITED STATES PATENT OFFICE.

DOMINGO PEREZ Y BUÑOL, OF HAVANA, CUBA, ASSIGNOR TO ALVAREZ, LOPEZ Y CIA., OF SAME PLACE.

MACHINE FOR MAKING CIGARETTE-BOXES AND PACKING CIGARETTES.

SPECIFICATION forming part of Letters Patent No. 579,038, dated March 16, 1897.

Application filed February 21, 1896. Serial No. 580,203. (No model.)

*To all whom it may concern:*

Be it known that I, DOMINGO PEREZ Y BUÑOL, a subject of the King of Spain, residing in Havana, Cuba, have invented a new and Improved Machine for Making Cigarette-Boxes and Packing Cigarettes, of which the following is a full, clear, and exact description.

The invention relates to a machine for continuously producing boxes adapted to receive cigars, cigarettes, or other articles and for packing the said articles into the boxes while the latter are in progress of manufacture.

The invention consists in a novel arrangement and combination of parts, and also in the construction of certain mechanisms, as will be hereinafter described and claimed.

The improved machine comprises a series of mechanisms or devices which are constructed to act successively (and in part simultaneously) to form a sheet of paper or other suitable material into the shape of a box, then introduce the articles to be packed into the said boxes, and finally close the boxes.

A paper or cardboard feed device supplies periodically the necessary material for the formation of each box. A cutter divides said cardboard or equivalent material into pieces of the requisite length. A conveyer then carries the said cut piece toward a mold or form having the shape of the box, and a folding device bends the ends of the cut piece over said form or mold to produce a receptacle, which is then carried into a position to receive the articles to be packed.

A chain-like conveyer is employed to hold the unfinished boxes stationary while they are being filled with the cigarettes or other articles, and tucking devices are located in the path of travel of the said chain to close the ends of the boxes, while a gumming device serves to securely fasten the tucked ends.

The machine also comprises a device whereby the cigars, cigarettes, or other articles will be mechanically arranged in regular lines or rows, and when thus arranged conveyed into the unfinished box while the latter is in its receiving position.

In order to fully disclose my invention, I will now proceed to describe the same specifically by the aid of the accompanying drawings, in which—

Fig. 27ª is a perspective view of a comb-like plunger for feeding the cigarettes, with the upper halves of some teeth removed.

Like letters and figures of reference indicate corresponding parts in all the views.

The machine compries a suitable frame or support 12, on which is located a table 19 and in which is journaled a drive-shaft 13, carrying a fast pulley and a loose pulley, as shown at 13ª, and also having mounted thereon a pinion 14, engaging a gear-wheel 15 on the main shaft 16. Said shaft carries a series of disks or cams adapted to operate the various mechanisms of the machine, the position of the cams being indicated by the numerals 1 to 11.

17 is a lower counter-shaft, and 18 an upper counter-shaft, both of which serve as fulcrums for the various levers which are actuated by the cams and control the motion of the various mechanisms.

The device for cutting and feeding paper or other material from which the boxes are made is shown best in Figs. 1 and 4 to 9. The table 19 carries a boxing 20 at one end, whereon is located a roll 21, in which is held the paper or other material. Said boxing is provided with a transverse aperture 20ᵈ, (see Figs. 6 and 7,) in which are adapted to reciprocate vertically the knives of the cutter. For this purpose the boxing 20 is provided with an extension or guide 22, in which are adapted to move slides 23 23ª, carrying shanks 24 24ª, to which are secured the knives or blades 25 25ª.

The slides 23 23ª are provided with pins 26 26ª, projecting through slots 22ª of the guide 22, said pins also engaging cam-slots 28ª in a disk 28, pivoted at 27 upon the guide 22. The disk 28 is provided with an extension 28ᵇ, pivotally connected to a rod 29, which is actuated by a lever 30, fulcrumed upon the counter-shaft 18 and provided with a roller 30ª, engaging a cam-groove 1ª in the cam 1. The lever 30 has a lateral arm 30ᵇ for connection with the rod 29, since said rod and lever are in different vertical planes.

The boxing 20 is further provided with a dovetail 20ª, which serves as a guide for the slide 31, having longitudinal movement on said boxing. The boxing is also longitudinally apertured, as shown at 20ᶜ, to allow of the passage of an arm 32, rigidly secured to the slide 31 and carrying plates or jaws 33, adapted to move in longitudinal slots 20ᵇ of the top of the boxing 20. The slide 31 is further provided with a vertical slideway, in which is adapted to move an auxiliary slide 34, having an arm 35, which carries jaws 36, arranged in alinement with the jaws 33. It will be understood that the jaws 33 have longitudinal movement only, while the jaws 36 have both longitudinal and vertical movement. In order to produce said vertical movement, the slide 34 carries a roller 37, adapted to run on a rail 38, which has a rising-and-falling movement, being pivoted to a link 39 and a bell-crank lever 40, both pivoted to the table 19 or to brackets projected therefrom. The bell-crank lever 40, at one side of its fulcrum 40ª, is engaged by an actuating-arm 41, having guided vertical movement in a suitable part of the machine's frame and pressed downward by a spring or its equivalent, so as to rest on the periphery of the cam-disk 3. Said periphery is provided with a depression 3ª, (see Figs. 1 and 4,) so that during the revolution of the shaft 16 the friction-roller 41ª, secured to the lower end of the arm 41, will enter said depression and thereby cause the rail 38 to be raised, while said rail will be lowered as long as the friction-roller 41ª rides upon the main portion of the cam-disk 3.

The longitudinal movement of the slides 31 34 is effected by means of a lever 43, carrying a toothed segment at its upper end to engage a rack 42 on the under surface of the slide 31. The lever 43 is fulcrumed on the lower counter-shaft 17 and has an angular arm 43ª, which is operated by the cam 4. (See Fig. 4.)

On the opposite side to that provided with the dovetail 20ª the boxing 20 has a similar dovetail 20ᵉ, on which is adapted to move a slide 44, receiving longitudinal movement by means of a lever 46, carrying a toothed sector engaging a rack 45 on the lower side of the slide 44. Said lever 46 is fulcrumed on the counter-shaft 17 and has a bell-crank arm 46ª engaging the cam 7. To one end of the slide 44 is secured a fixed jaw 47 and a movable jaw 49, pivoted at 48. (See Fig. 7.) The movable jaw is rigidly connected to a pinion 50, engaged by a rack 51 at the end of a rod 52, having guided movement in lugs or sockets 53, secured to the slide 44. To said rod is also secured, by means of set-screws or like devices, a downwardly-extending arm 54, whose lower end projects into the path of travel of projections or tappets 56 on a rod 55, having guided movement in the stationary bracket 55ª. The rod 55 is actuated by a bell-crank lever 57, whose movement is controlled by a rod 58, engaging at its lower end the cam 6.

The operation of this cutter and feed device is as follows: Assuming the knives 25 25ª to be fully apart, so as to allow the jaws 33 36 to pass between them, and the rail 38 to be in its elevated position, the slides 31 34 are carried toward the roll 21 by the toothed sector 43, and then the slide 34 is lowered, so that the paper is clamped on the table of the boxing 20, between the jaws 33 and 36. The slide 31 then moves back to the position shown in Fig. 6, and thereupon the knives 25 25ª move toward each other and cut off the required length of material. At about the same time the paper has been carried forward so that its front edge comes between the jaws 47 and 49 one of the tappets 56 is brought in contact with the arm 54, so as to close the jaw 49 upon the jaw 47, and immediately after the cutter has come into operation the rail 38 is again raised, so that the paper is released from the clamp formed by the jaws 36 33. The slide 44 then moves forward from the position shown in Fig. 6 toward the mold over which the material is to be folded into the shape of a box, as will be fully described presently, and when the paper has come into operative relation to said mold the arm 54 is engaged by the other tappet 56, so as to open the clamp formed by the jaws 49 47 and to release the paper therefrom. The slide 44 then returns to the position shown in Figs. 5, 6, and 7. The jaws 47 49, with their slide 44, form a conveyer or carrier to bring the cut material into operative relation to the mold.

Figure 5:
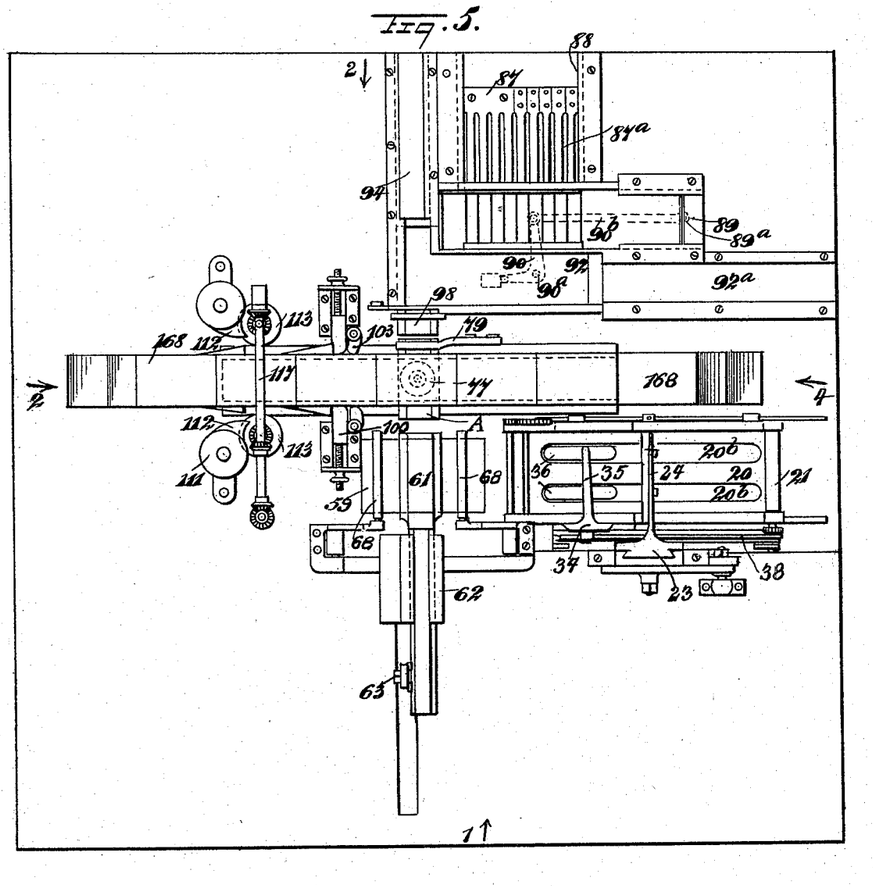
Fig. 5 is a plan view of the machine with the hopper 82 omitted.
Figure 6:
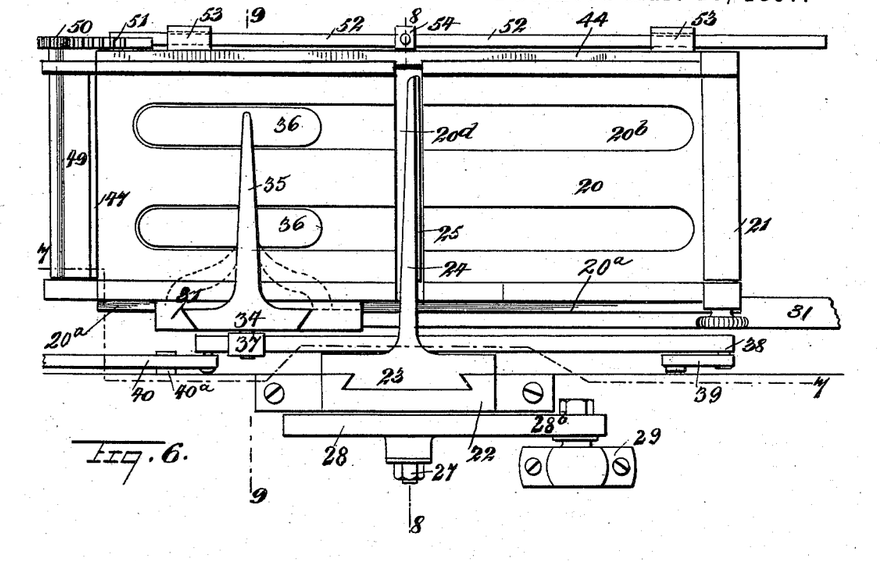
Fig. 6 is a plan view of the paper-feed device and the cutter.
Figure 7:
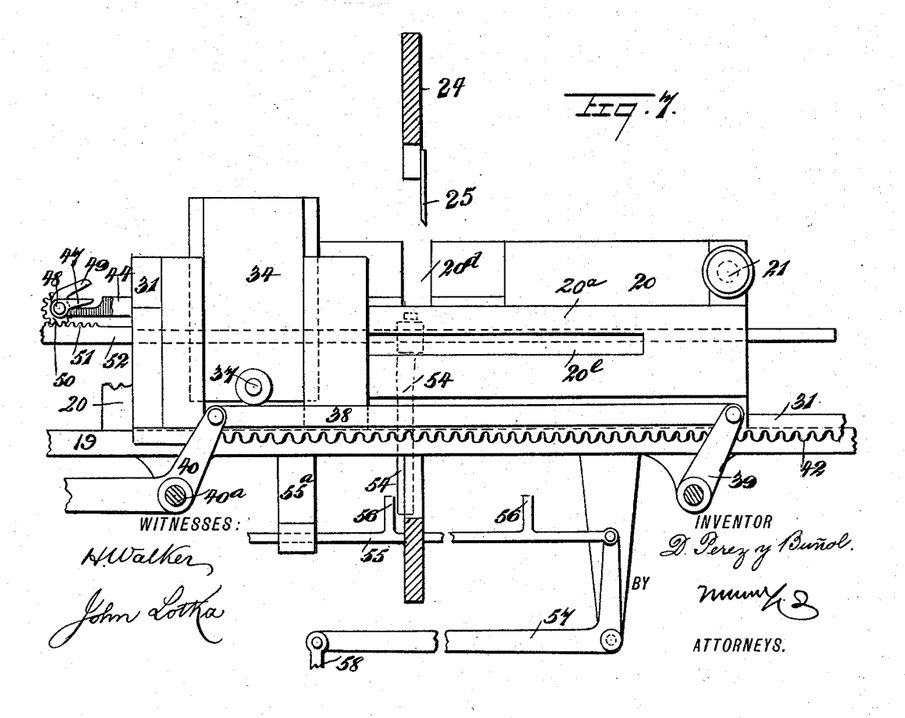
Fig. 7 is a longitudinal sectional elevation thereof on the line 7 7 of Fig. 6. Fig. $7^a$ is a similar sectional view on the line $7^a$ $7^a$ of Fig. 6.
Figure 7A:
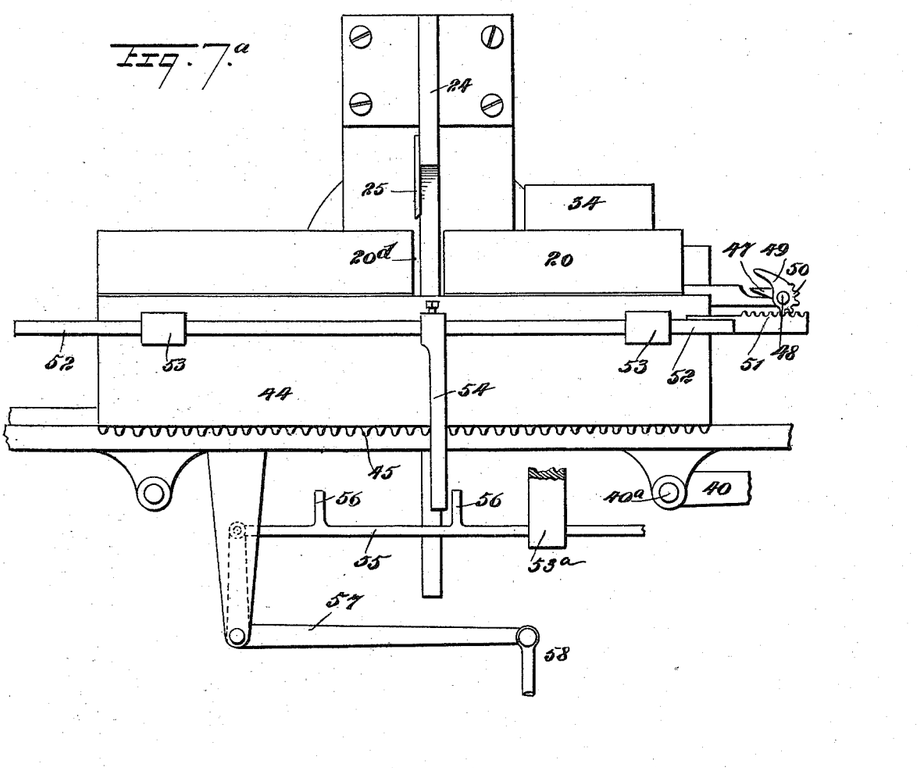
Figure 8:
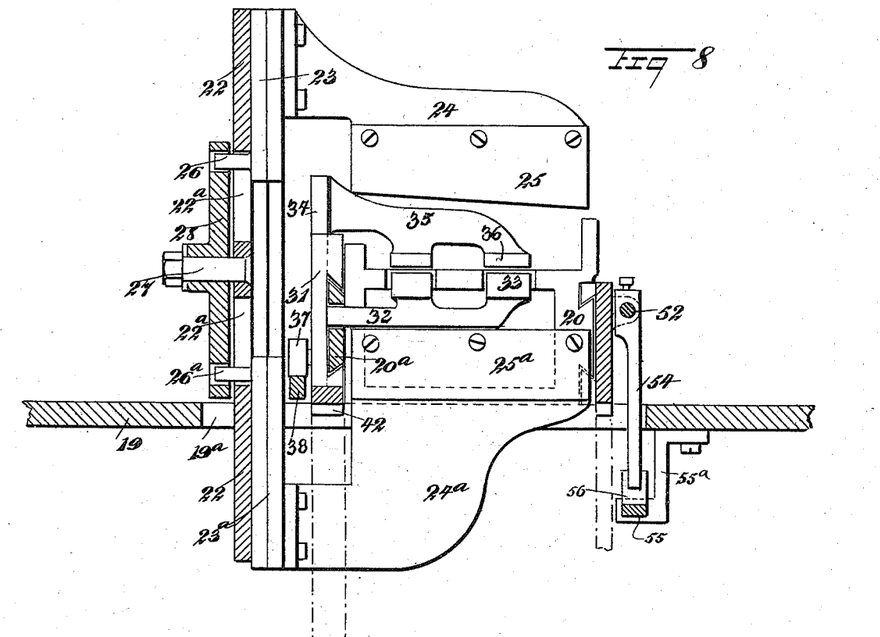
Fig. 8 is a transverse section thereof on the line 8 8 of Fig. 6.
Figure 9:
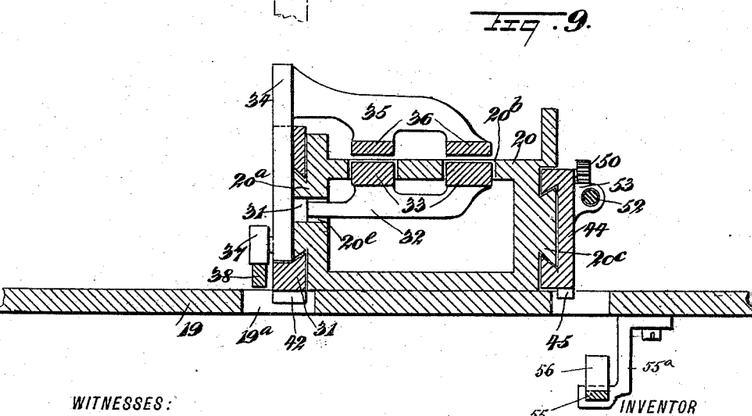
Fig. 9 is a similar view on the line 9 9 of Fig. 6.
Figures 10, 11:
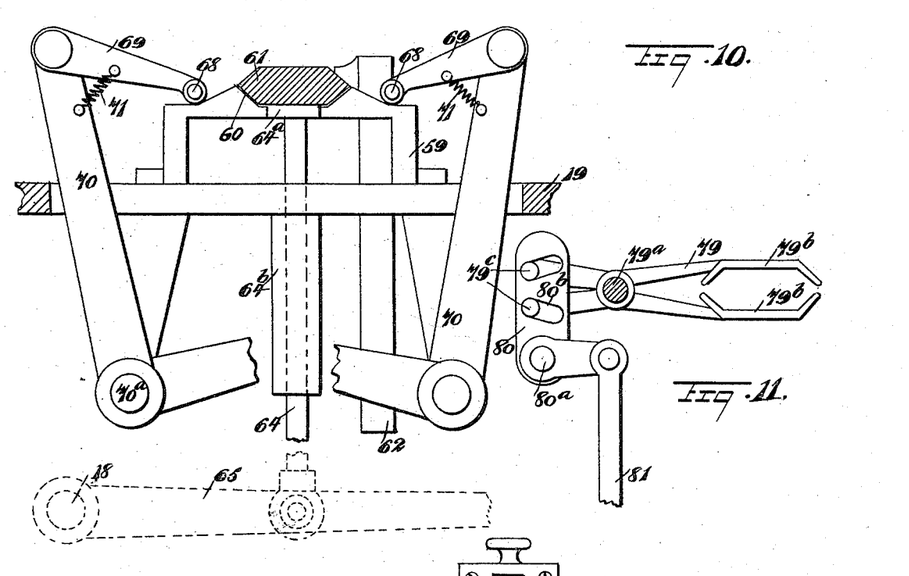
Fig. 10 is an elevation of the folding device with parts in section.
Fig. 11 is a detail elevation of the pair of the jaws for holding the unfinished box in its receiving position.

The construction of the mold and the device for folding the ends of the paper over the mold is as follows: On the table 19 is secured a rest 59, (see Fig. 10,) having a depression 60, on which is adapted to rest the form or mold 61. Said form, as more fully described hereinafter, has both a longitudinal and a vertical movement, and is guided for its horizontal movement in a slide 62, (see Figs. 1 and 5,) said slide moving vertically in suitable apertures of the table 19. The rest 59 has a longitudinal opening in its bottom, and in said opening is adapted to move vertically a presser-plate 64$^a$, carried by the upper end of a rod 64, which is guided in a sleeve 64$^b$, secured to the table 19. The rod 64 is adapted to receive a vertical movement from the cam 4 by means of a lever 65. (See Figs. 1 and 10.) The mold 61 rests on the support 59 when said mold is in its inner position, as illustrated in Fig. 5, and at intervals the mold is raised, so that the cut piece of paper or other material can be passed between the mold and the rest 59. This is effected by means of a lever 62$^a$, Figs. 1 and 4, controlled by the cam 3. The rear end of the mold is provided with lugs or horns 61$^a$, (see Fig. 4,) which engage a pin 63 on a lever 66, pivoted at 66$^a$. Said lever receives its motion from the cam 2 through the medium of a lever 67. It will be understood that the lugs 61$^a$ form a slideway for the reception of the pin 63, so that a vertical movement of the slide 62 can take place without bringing the rear end of the mold 61 out of engagement with the pin 63. The rocking movement of the lever 66 imparts a longitudinal motion to the mold 61, so that said mold can advance from the position shown in Fig. 5 toward the opposite side of the machine, as more fully described hereinafter. On the rest 59 are adapted to run rods or rolls 68, secured to the free ends of arms 69, pivoted to the bell-crank levers 70, and held down by springs 71, so as to remain in engagement with said rest 59. The bell-crank levers 70 are pivoted at 70$^a$ and are operated from the cams 5 and 6 by means of levers 72. (See Fig. 2.)

The operation of the mold and the folder is as follows: The folding-rolls 68 being approximately in the position shown in Fig. 10 and the mold 61 being elevated so that the paper can pass thereunder, the carrier formed by the jaws 47 49, with the paper clamped between said jaws, advances above the rolls 68 and below the mold 61, so that the paper is supported on the rest 59 and the rolls 68, the mold being in the position illustrated by Fig. 5. The jaw 49 then opens to such an extent that it is in substantially the same horizontal plane with the fixed jaw 47, so that the paper is released and the carrier formed by the jaws can be withdrawn under the paper. After the carrier has returned to its initial position the presser-plate 64$^a$ is raised against the paper to hold it in contact with the mold. Thereupon the mold 61 and the presser-plate 64$^a$ are lowered into the position shown in Fig. 10, so as to press the paper into the depression 60 of the rest 59. One of the folding rods or rolls 68 is then moved on the rest 59 toward and over the mold 61, so as to bend one end of the paper into contact with the mold. Thereafter the other roll 68 is advanced to fold the opposite end of the paper, the first-mentioned roll remaining stationary to prevent the end of the paper from flying upward until the two rolls are practically in contact with each other, (except for the end of the paper intervening between them.) The two rolls then move in unison in the same direction until the second end of the paper also is fully folded, so that there is formed a box open at both ends and of the same shape as the mold 61. The box being so far completed the mold 61 is advanced toward the conveyer, to be described presently, the box being carried along with the mold and the rolls 68 preventing the ends of the box from flying open until said box is held within the conveyer. Thereafter the mold is withdrawn, leaving the box in the conveyer, and then the mold is again raised off the rest 59, so that the carrier formed by the jaws 47 49 can again pass under the mold 61 to bring another cut piece of paper into operative relation thereto.

Figures 12, 13, 14, 15, 16, 17:
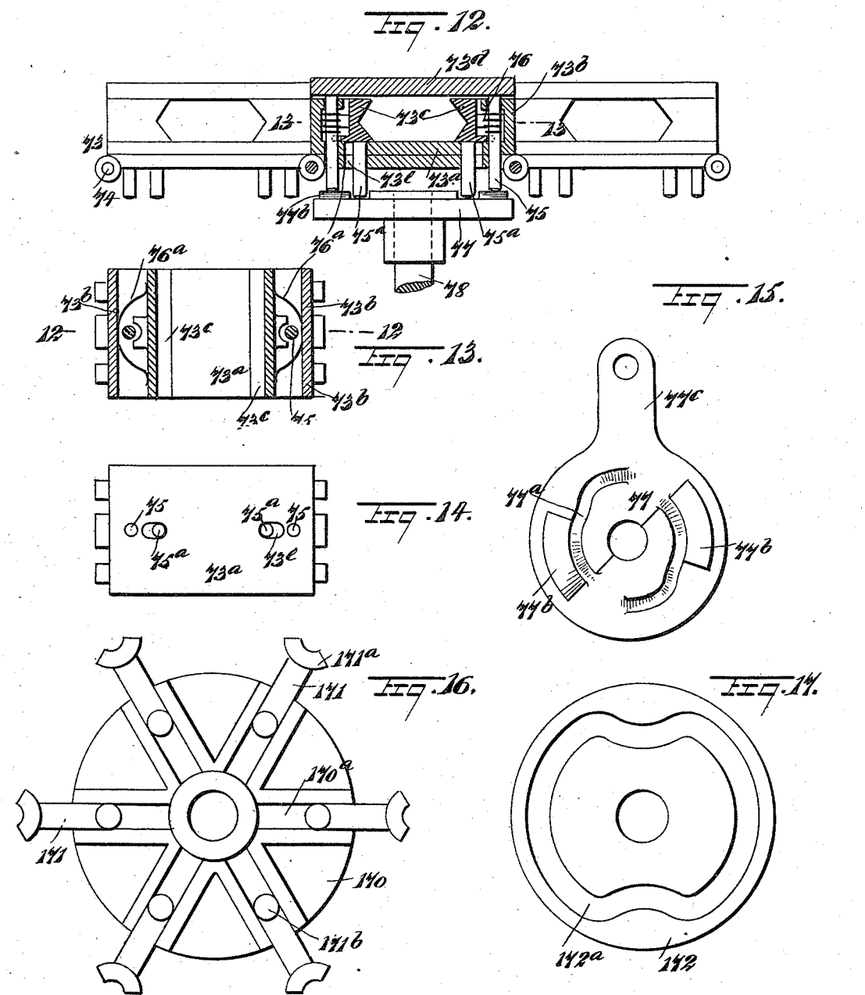
Fig. 12 is a detail elevation of the conveying-chain, showing one of the links in section on the line 12 12 of Fig. 13 and in operative relation to a mechanism for increasing the size of the opening adapted to receive the box.
Fig. 13 is a sectional plan view of one of the chain-links on the line 13 13 of Fig. 2.
Fig. 14 is an inverted plan view of such a link.
Fig. 15 is a plan view of a cam for increasing the size of the box-receiving opening of the chain-link.
Fig. 16 is a detail elevation of the wheel or drum over which passes the conveying-chain.
Fig. 17 is an elevation of a stationary cam working in conjunction with said drum.
Figure 18:
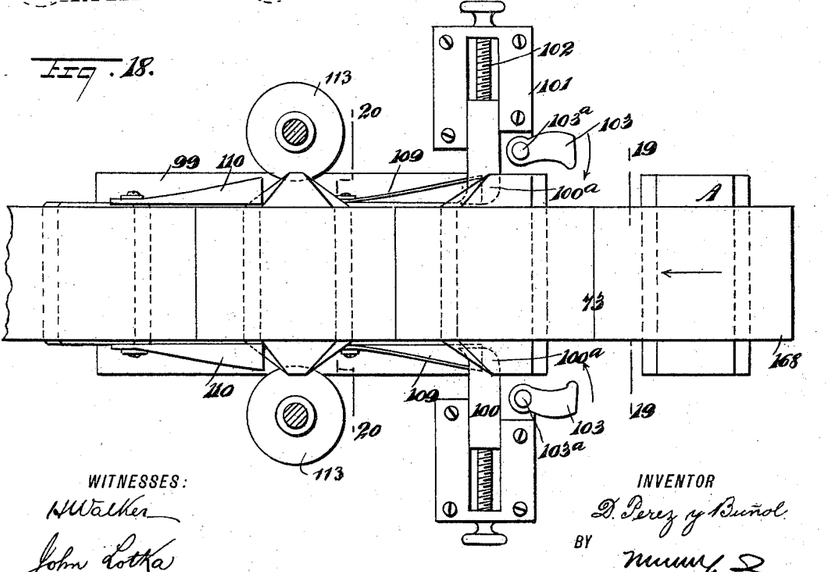
Fig. 18 is a plan view showing part of the conveying-chain in connection with a tucker and the gumming device.

I will now describe a conveyer or chain which is constructed to receive the unfinished boxes or shells. Said conveyer 168 consists of a series of links 73, (see Figs. 1, 5, 12, 13, 14, and 18,) which are connected by pivots 74 and comprise bottoms 73$^a$ and end walls 73$^b$, which are stationary relatively to each other. The bottom 73$^a$ has longitudinal slots 73$^c$, (see Fig. 14,) and in said slots are adapted to move pins 75$^a$, projected downwardly from the inner sides 73$^c$, which are held in an inner position by flat springs 76$^a$, interposed between said inner sides and the end walls 73$^b$. The bottom 73$^a$ also receives vertically-movable pins 75, carrying a movable top 73$^d$ and pressed downward by springs 76. The top, bottom, and inner sides are so formed as to inclose between them a free space of approximately the same shape as the mold 61, as will be seen best in Fig. 12. The chain 168 passes over drums 170, which are mounted on pivots 169 and are provided with radial slide-ways 170$^a$, in which are adapted to move slides 171, carrying at their outer ends bearings 171$^a$, adapted to receive the pins or pivots 74 of the links 73 of the chain 168. At their inner ends the slides 171 are provided with pins 171$^b$, which are adapted to move in cam-grooves 172$^a$, produced upon a stationary plate 172, which is secured to the frame of the machine. The purpose of this arrangement is to keep the links forming the upper run of the chain horizontal while said links are in operative relation to the mechanism for feeding the unfinished boxes and the cigarettes or other articles to said links.

It will be seen that the space in the link which is adapted to receive the unfinished boxes may be increased by forcing the top 73$^d$ upward and the inner sides 73$^c$ outward. In order to effect this while the link is in its receiving position, I have located beneath said link a cam-plate 77, which has cam-grooves 77$^a$ to engage the pins 75$^a$ and inclined cams 77$^b$ to engage the pins 75. This cam-plate is operated by any suitable mechanism connected to the extension 77$^c$ to enlarge the size of the open space in the link at the time the unfinished box is inserted therein, so that said box may readily enter the link, and, moreover, the box will be adapted to receive different numbers of cigarettes or other articles within certain limits.

In order to hold the free end of the unfinished box A when the mold 61 is retracted, I provide jaws 79$^b$, (see Fig. 11,) which are secured to the ends of the arms 79, fulcrumed at 79$^a$ and carrying at their rear ends pins 79$^c$, engaged by diverging slots 80$^b$ in a bell-crank lever 80, which is fulcrumed at 80$^a$ and operated by a connecting-rod 81, controlled by the cam 8. (See Fig. 4.)

It will be obvious that the rocking movement of the bell-crank lever 80 will cause the jaws 79$^b$ to open and close.

An intermittent motion is imparted to the conveyer or chain 168 by means of a spring-pressed pawl-lever 168$^a$, pivotally connected to an arm 168$^d$, fulcrumed at 168$^b$, said pawl-lever engaging a ratchet-wheel 169$^a$ upon the drum 170 (see Fig. 1) and being operated from the main shaft 16 by means of an eccentric-rod 168$^c$.

Figure 26:
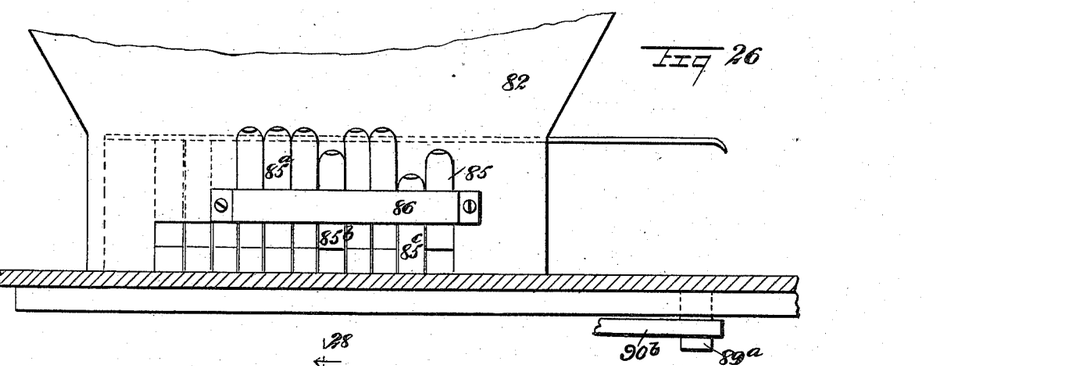
Fig. 26 is a broken end elevation of the distributer adapted to receive the articles and to arrange them in regular lines.
Figure 27:
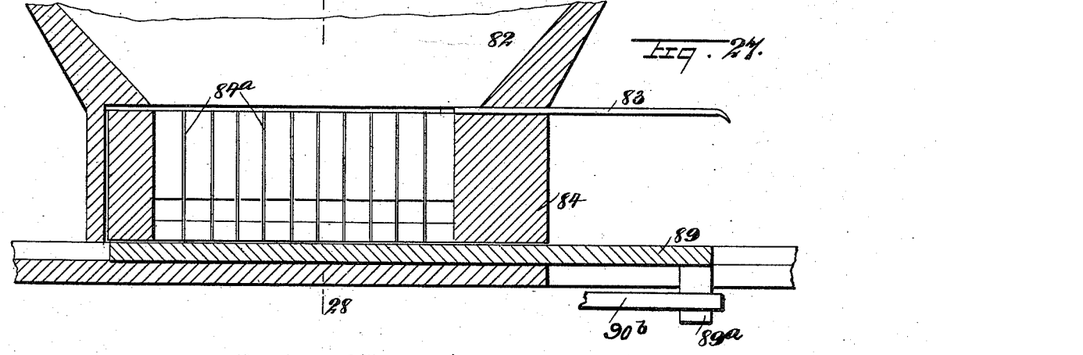
Fig. 27 is a broken sectional elevation of the same device on the line 27 27 of Fig. 28.
Figure 27A:
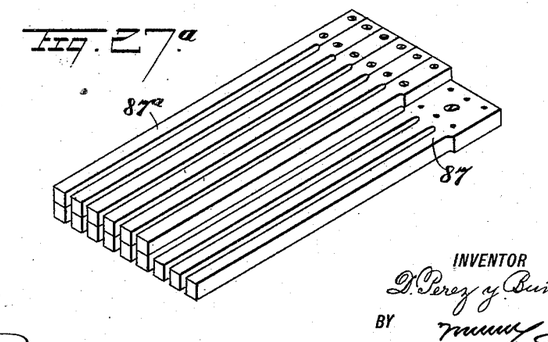
Figure 28:
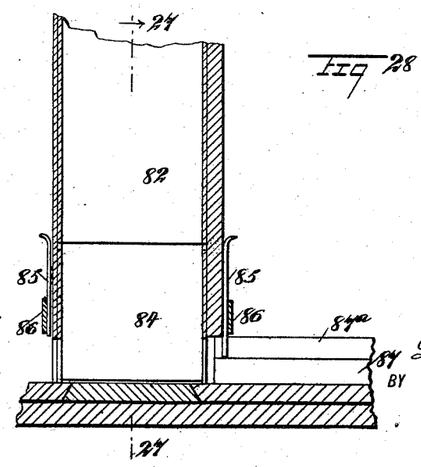
Fig. 28 is a transverse vertical section of the said device on the line 28 28 of Fig. 27.
Figure 29:
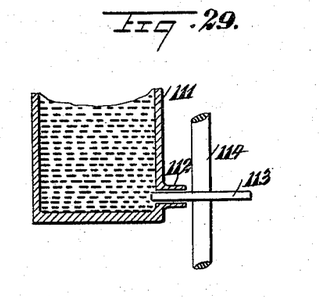
Fig. 29 is a broken sectional elevation of the gumming device.

The mechanism for arranging the cigarettes or other articles in regular rows and delivering said articles into the unfinished boxes held in the links of the chain 168 is shown best in Figs. 5 and 26 to 28. The cigarettes are thrown into a hopper 82, the bottom of which may be closed by means of a slide 83, and below which is located the laterally-movable box 84, divided by partitions 84$^a$ into compartments of approximately the width and length of the cigarettes or other articles. For the sake of clearness the hopper 82 has been omitted in Fig. 5. The end walls of the hopper are apertured at their lower portion, as shown in Figs. 26 and 28, so that the cigarettes may be removed endwise from the compartments of the movable box 84, and in the particular construction shown the opening in the end walls of the hopper is of sufficient size to allow two cigarettes to be delivered therefrom, one above the other. I prefer to provide adjustable doors 85, having the same width as the compartments of the box 84, said doors when in the position indicated by 85$^a$ allowing two superposed cigarettes to issue from the hopper, while in the position shown at 85$^b$ only one cigarette will be allowed to be delivered, and in the position 85$^c$ the compartment alining with that door will be entirely closed. The doors 85 are preferably held in frictional engagement with a clamp or guide plate 86, so that they will remain in position after being adjusted.

In order to remove the cigarettes endwise from the receptacle 84, I provide a comb 87, (see Fig. 5,) having a reciprocating movement in guides 88 in a direction parallel to the partitions 84$^a$. The prongs or teeth of the comb are made of about the same thickness as two cigarettes. In order that the comb may also be used when one or more of the doors 85 are lowered half-way to the position indicated by 85$^b$, I make some of the teeth in two parts, so that the upper half 87$^a$ may be removed to enable the said tooth or prong to properly coöperate with the lowered door 85$^b$. It will be understood that by this means the operator may control the number of cigarettes which will be discharged from the box 84 at each operation of the comb 87. This number may also be controlled by means of the slide 83. In order to impart a shaking motion to the box 84, said box is connected to a slide 89, having a pin 89$^a$, connected by means of a rod 90$^b$ to a bell-crank lever 90, fulcrumed at 90$^a$ (see Figs. 4 and 5) and controlled by a rod 91, which is fast upon the bell-crank lever and receives a reciprocating motion by means of a wave-shaped groove in the periphery of the cam-disk 9.

The cigarettes or other articles pushed out from the receptacle 84 by the comb 87 are discharged on the trough or table 92 and are then crowded to one side by means of a plunger 92$^a$, said plunger moving at right angles to the direction in which the comb moves, and the end of the plunger which engages the cigarettes is preferably recessed in a similar way to the inner sides 73$^c$ of the chain-links. The plunger 92$^a$ is formed with a rack 92$^b$ in its under surface, (see Fig. 4,) which is engaged by the segment 93$^a$ on a rocking arm 93, fulcrumed on the lower counter-shaft 17 and controlled by the cam 9.

In order to push the cigarettes into the box held in the chain 168, I provide another plunger 94, moving in a parallel direction to the comb 87 and adapted to force the cigarettes through an outlet 98 into the box A, as will be understood by reference to Fig. 5. The plunger 94 is operated by means of a bell-crank lever 97, (see Figs. 2 and 4,) fulcrumed at 97$^a$ and connected to a rod 98$^a$, actuated by the cam 9. The comb 87 is operated by another bell-crank lever 95, fulcrumed at 95$^a$ and operated by a rod 96, controlled by the cam 11.

The operation of this part of the machine will be obvious. The cigarettes thrown into the hopper 82 can fall into the compartment of the shaking box or receptacle 84 in one position only, and will thus be arranged in parallel rows. The comb 87 will then remove as many cigarettes as the position of the doors 85 will allow, and these cigarettes will then be conveyed into the box A by the successive operation of the plungers 92$^a$ and 94. As above stated, the links of the chain will receive different numbers of cigarettes within certain limits. If, however, only very few cigarettes or an unusually large number of them is to be packed into one box, the movable side walls 73$^c$ and top walls 73$^d$ of the chain-links will be exchanged according to the requirements.

Figure 24:
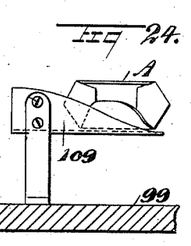
Figure 25:
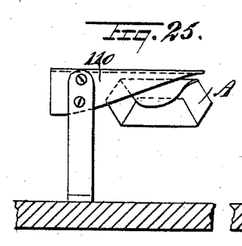

Finally, I will describe the mechanism for tucking the protruding ends of the box and closing the same. This mechanism is best shown in Figs. 5 and 18 to 26. A table 99 is secured to the table 19 to serve as a guide or support for the links 73 of the chain. Adjacent to said table are located stationary tuckers 100, having rounded forward ends 100$^a$, adapted to engage the box A as the same moves along with the chain 168, said tuckers being adjustable by means of screws 102 in guides 101. These tuckers 100 are adapted to engage the protruding ends of the box A first. A second set of tuckers 103 are pivoted at 103$^a$ at the sides of the chain and are adapted to swing inward to tuck the opposite ends of the box to those engaged by the stationary tuckers 100. (See Fig. 23.) The pivoted tuckers are each operated by means of a bevel-wheel 104, engaged by bevel-wheel sectors 105 on a shaft 106, having a crank-arm 106$^a$, to which a rocking motion is imparted by a connecting-rod 107 and a lever 108, fulcrumed on the shaft 18 and operated by the cam 7, Fig. 3. As the chain proceeds farther, the lower protruding portions of the box A are engaged by twisted blades 109, whose front portions, which are first engaged by said boxes, are approximately horizontal, while their rear edges, which are engaged last, are approximately vertical, so that the lower flap of the box end is gradually folded upward, as illustrated by Fig. 24. In a similar manner the upper flap is folded downward by engagement with the stationary spiral blade 110, of identical formation with the blades 109, but of reverse arrangement. Between these two last tucking operations, as illustrated by Figs. 24 and 25, the ends of the box A are gummed, so that when the upper flap is turned down the box will be securely sealed.

Figure 1:
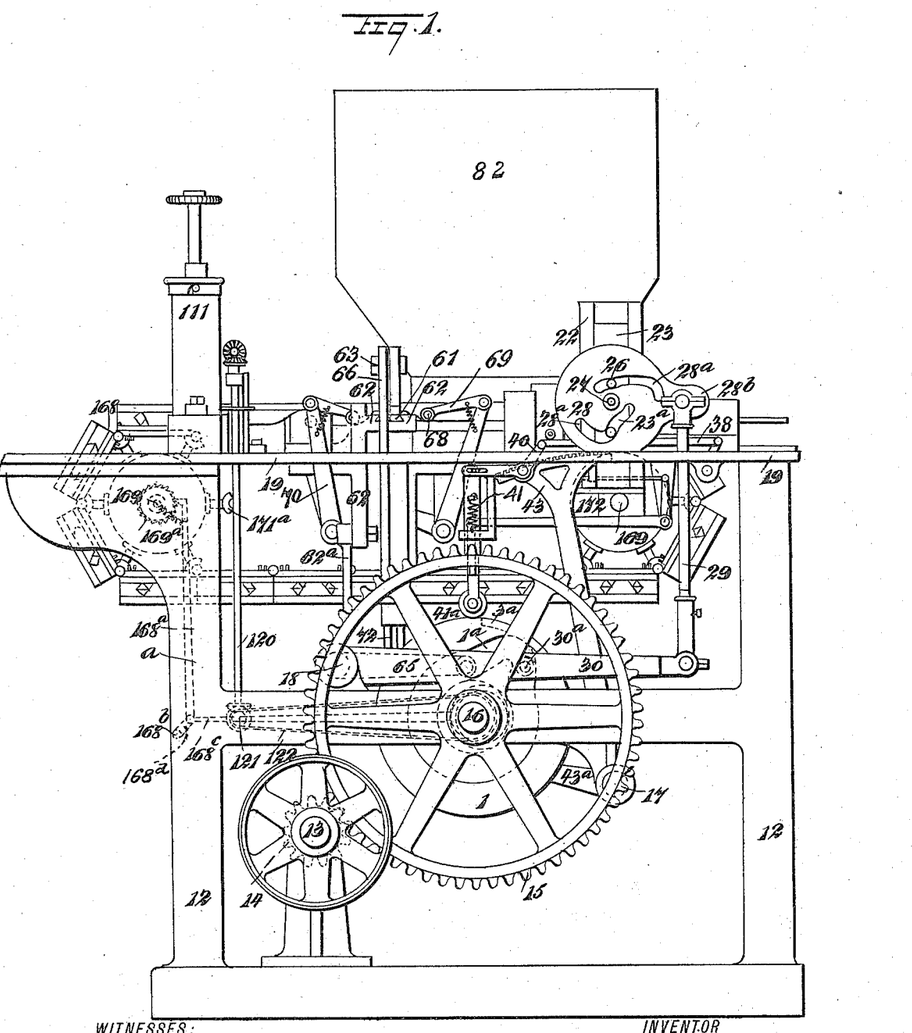
Figures 1, 2, 3, and 4 are elevations each showing the machine as seen from one of its four sides, Figs. 1 and 3 representing opposite sides of the machine, and Figs. 2 and 4 likewise, the directions in which said views are taken being indicated in Fig. 5 by arrows marked 1, 2, 3, and 4, respectively.
Figure 2:
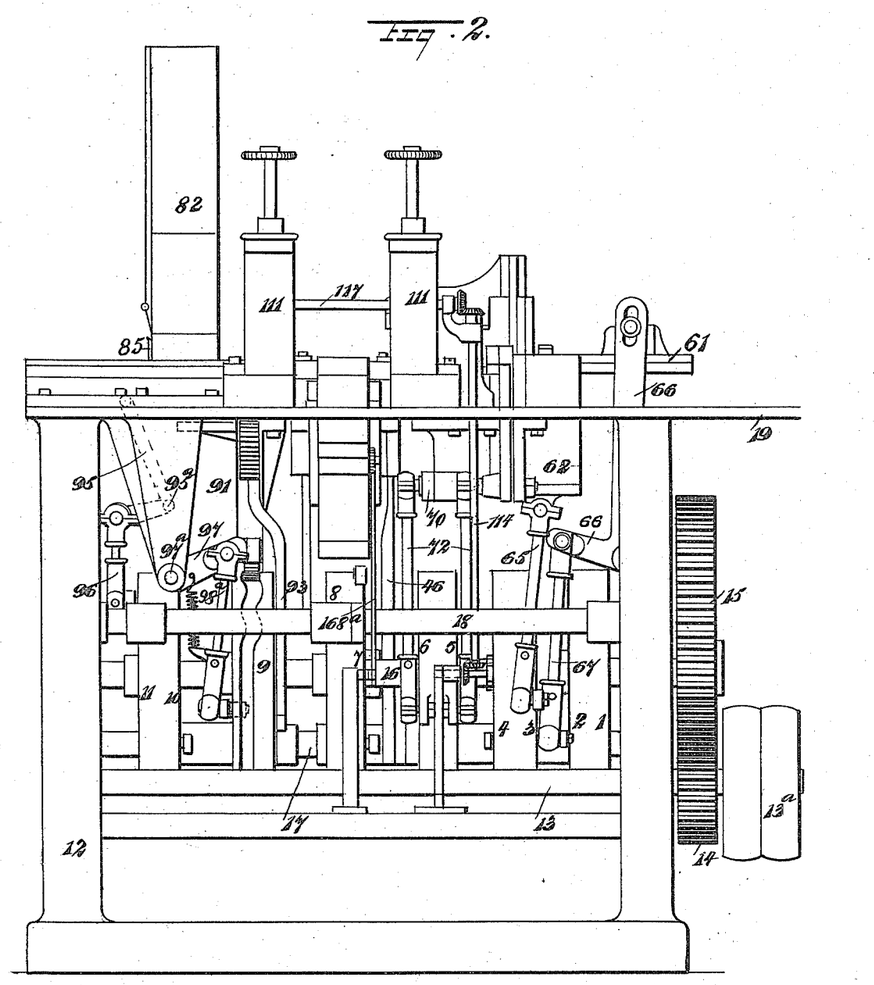
Figure 3:
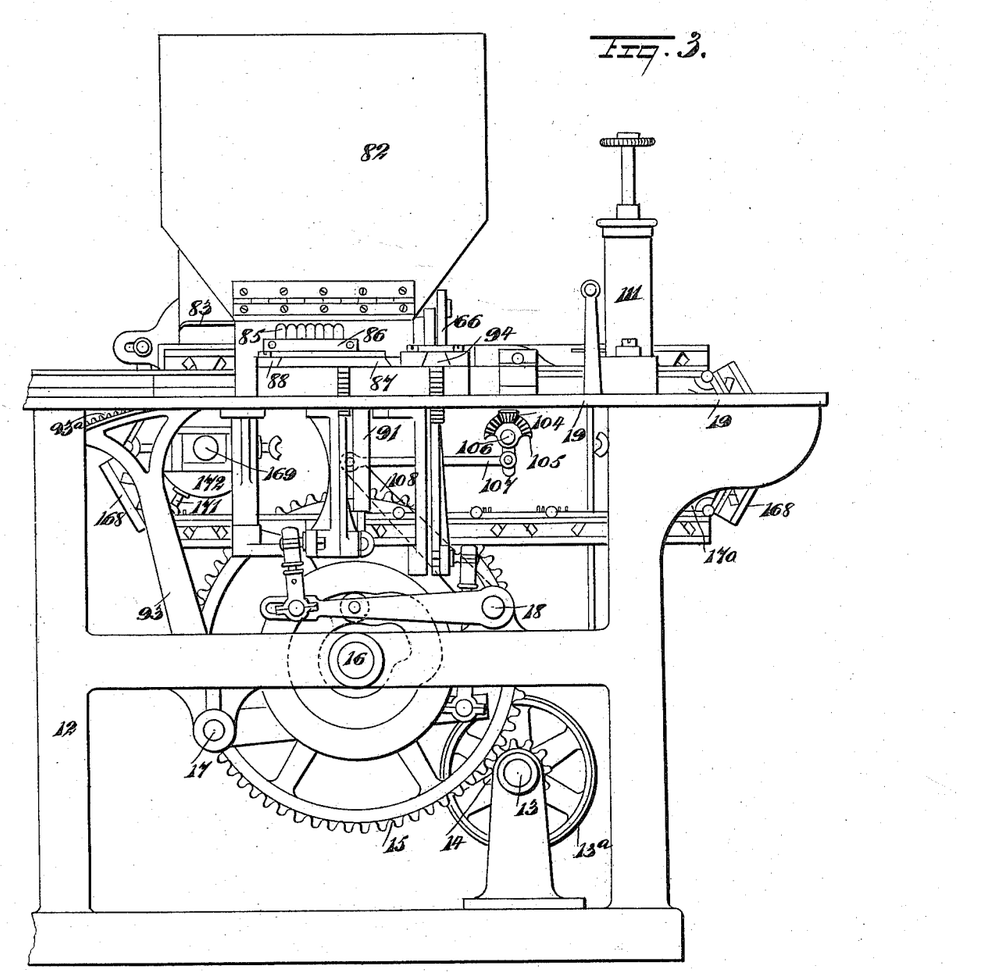
Figure 4:
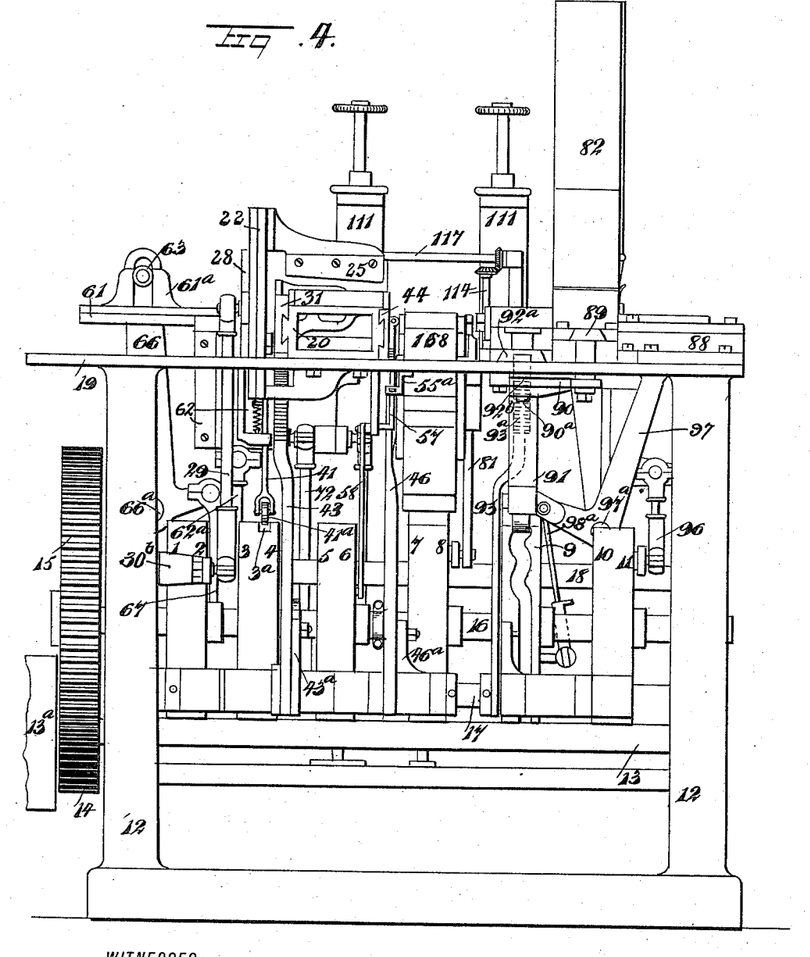
Figures 19, 20, 21:
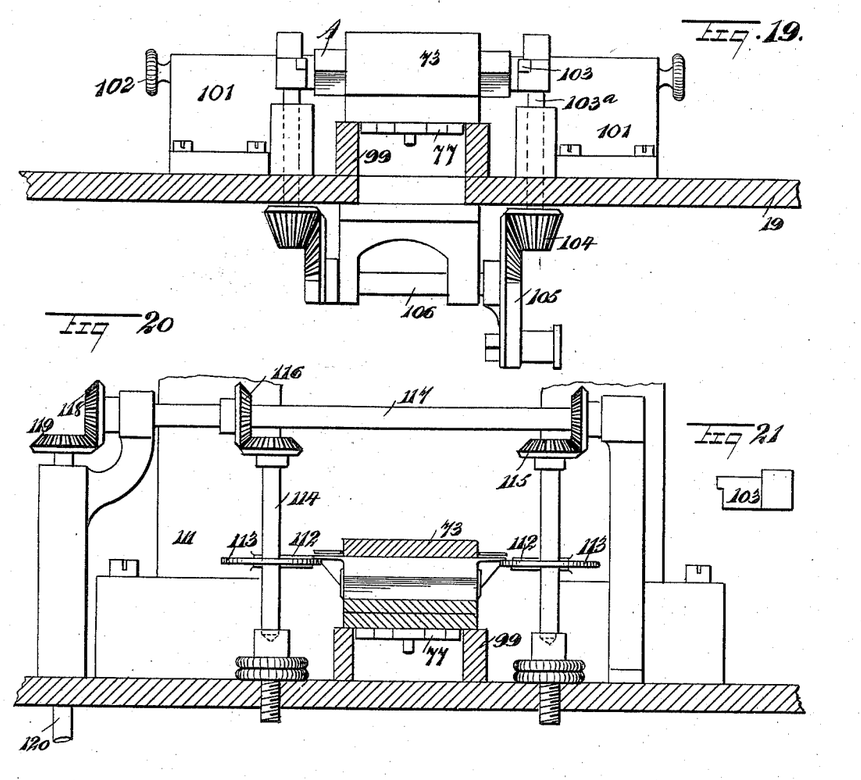
Fig. 19 is a transverse sectional elevation taken on the line 19 19 of Fig. 18, the chain being shown in end view.
Fig. 20 is a similar view on the line 20 20 of Fig. 18.
Fig. 21 is an elevation of one of the tucking-points.
Figure 22:
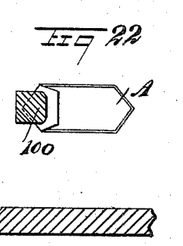
Figs. 22 to 25, inclusive, are diagrammatic views illustrating the action of the tucker in successively bending the ends of the box at the corners.
Figure 23:
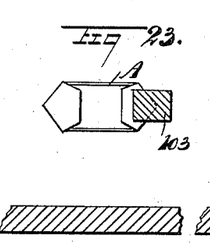

The gumming device is shown best in Figs. 5 and 19 to 21, and comprises a mucilage-tank 111, having a projecting curved lip 112, within which is mounted to rotate the mucilage-disk 113, adapted to engage the upper flap of the box A, as shown in Fig. 20. Said disk is mounted on a shaft 114, carrying beveled wheels 115, to which a rotary motion is imparted by means of bevel-wheels 116 on a shaft 117, carrying another bevel-wheel 118, engaged by a mating wheel 119 on a shaft 120. The latter is operated from the drive-shaft 16 in any suitable manner, for instance, as indicated in Fig. 1, by means of bevel-wheels 121 and a driving belt or rope 122.

Having thus described my invention, I claim as new and desire to secure by Letters Patent—

1. A box-making machine, comprising a mold of substantially the shape of the box, a device for carrying the material into operative relation to said mold, means for folding the material around the mold, a conveyer having spaces or chambers adapted to receive the boxes, jaws located adjacent to said conveyer and arranged to take hold of one end of the box, means for carrying the mold with the box toward said jaws, mechanism for opening and closing the jaws, and devices for closing the ends of the boxes, substantially as described.

2. A feed device for paper or other material in sheets or rolls, said device comprising a slide carrying a fixed jaw, and provided with an approximately vertical slideway, an auxiliary slide mounted to move in said slideway, and carrying a jaw registering with the fixed jaw and adapted to clamp the material thereon, a vertically-movable track or rail engaged by said auxiliary slide, and means for operating said rail to separate the jaws or close them, substantially as described.

3. The combination of the jaws adapted to feed the material forward, the knives for cutting said material into pieces of appropriate length, a slide carrying a fixed jaw located in advance of the aforesaid feed-jaws, a movable jaw pivoted to the fixed jaw and adapted to clamp the forward edge of the material thereon, a pinion rigidly secured to said pivoted jaw, a slidable rack engaging said pinion, means for operating the rack, and means for moving the slide longitudinally to carry the cut material forward, substantially as described.

4. The combination of the stationary rest having a recess, the vertically-movable mold located above said rest, a carrier adapted to convey the paper or other material between the mold and the rest, the presser-plate arranged to move vertically in the recess of the rest and adapted to press the material against the under side of the mold, and the transversely-movable folders arranged laterally of the mold and adapted to bend the material around the same, substantially as described.

5. The combination of the vertically and longitudinally movable mold, a carrier for conveying the material to said mold, a folding device for bending the material around the mold, a conveyer having spaces or chambers to receive the mold and the unfinished box, a device for feeding the articles, such as cigarettes, to the unfinished box while the same is held in the conveyer, and means for closing the ends of the said box after the articles have been packed therein, substantially as described.

6. A conveyer-chain, the same consisting of links having vertically-movable top plates and laterally-movable sides, forming between them an expansible space or chamber adapted to receive a box, means for inserting a box into said chamber, and a device for moving the walls of the said chamber from each other while the link is in its receiving position, substantially as described.

7. A conveyer-chain, the same consisting of links having bottom walls and end walls rigidly connected thereto, a vertically-movable top wall, laterally-movable inner sides, springs for pressing said movable walls toward each other, said walls inclosing between them a space or chamber adapted to receive a box, and means for moving said walls from each other when the link is in its receiving position, substantially as described.

8. A conveyer-chain, the same consisting of links having bottom walls and end walls rigidly connected thereto, a spring-pressed top wall having vertically-movable projections extending through the bottom wall, laterally-movable inner sides controlled by springs, and having pins projecting through the bottom wall, said walls inclosing between them a chamber adapted to receive a box, and a cam mounted to turn about a stationary axis and arranged to engage the pins and projections from the movable walls of the link to expand the chamber formed by said walls when the link is in its receiving position, substantially as described.

9. The combination of a conveyer adapted to carry boxes with the open ends of the boxes protruding from the conveyer, stationary tucking-points adapted to engage the forward edges of the said protruding ends, swinging tucking-points arranged to engage the rear edges of the said protruding box ends, and spiral blades arranged to engage successively the upper and lower flaps of the box ends to fold them inward, substantially as described.

10. The combination of the conveyer adapted to carry boxes with the ends of the boxes protruding from the conveyer, stationary tucking-points adapted to engage the forward edges of the protruding box ends, pivoted tucking-points adapted to engage the rear edges of the said boxes, spiral blades arranged to engage the lower flaps of the said box ends and fold them upward, similar inverted spiral blades to engage the upper flaps of the box ends and fold them downward, and a gumming device arranged between the two sets of spiral blades to gum the protruding ends of the box, substantially as described.

11. The combination of the conveyer adapted to carry boxes with the ends of the boxes protruding from the conveyer, tucking devices arranged adjacent to the path of travel of the conveyer and adapted to engage the forward and rearward edges of the said protruding box ends to tuck them in so as to produce an upper and a lower flap on each of said box ends, and spiral blades arranged in the path of travel of said flaps and adapted to fold the same inward, substantially as described.

12. The combination of the conveyer adapted to carry boxes with the ends of the boxes protruding from the conveyer, tucking devices arranged adjacent to the path of travel of the conveyer and arranged to engage the forward and rearward edges of the said protruding box ends to tuck them in so as to produce an upper and a lower flap on each of said box ends, spiral blades arranged in the path of travel of said flaps to fold them inward, and a gumming device arranged between the said spiral blades to gum the said flaps, substantially as described.

13. An apparatus for packing cigarettes and other articles into boxes, comprising a conveyer or holder for the boxes, a receptacle adapted to contain said articles and provided with partitions to compel the articles to arrange themselves in regular rows, a comb-like plunger whose members or teeth are adapted to pass between said partitions to force the cigarettes out of the receptacle, a trough or table arranged to receive the articles discharged from said receptacle and provided with an outlet leading to the box, and a plunger arranged in line with said outlet to push the cigarettes into the box, substantially as described.

14. An apparatus for packing cigarettes and other articles into boxes, comprising a conveyer or holder for the boxes, a receptacle adapted to contain said articles and provided with partitions to compel the articles to arrange themselves in regular rows, a comb-like plunger whose members or teeth are adapted to pass between said partitions to force the cigarettes out of the receptacle, a trough or table arranged to receive the articles discharged from said receptacle and provided with an outlet leading to the box, a plunger arranged to move transversely of the cigarettes to crowd the same toward said outlet, and another plunger arranged to move longitudinally of the cigarettes and to push the same through the outlet, substantially as described.

15. An apparatus for packing cigarettes and other articles into boxes, comprising a holder for the boxes, a hopper adapted to receive the cigarettes, a shaking receptacle below the hopper, said receptacle having a series of parallel partitions whereby the cigarettes will be alined in regular rows, and means for pushing the cigarettes out of said receptacle and into the boxes, substantially as described.

16. An apparatus for packing cigarettes and other articles into boxes, comprising a holder for the boxes, a hopper adapted to receive the cigarettes and having openings in its end walls near the bottom thereof, a partitioned shaking receptacle into which the cigarettes are adapted to fall from the hopper, a comb-like plunger adapted to pass through the openings in the end walls of the hopper and between the partitions of the receptacle to push the cigarettes out therefrom, and means for conveying said cigarettes into the boxes, substantially as described.

17. An apparatus for packing cigarettes and other articles into boxes, comprising a holder for the boxes, a hopper adapted to receive the cigarettes and having openings in its end walls near the bottom thereof, a partitioned shaking receptacle into which the cigarettes are adapted to fall from the hopper, a comb-like plunger adapted to pass through the openings in the end walls of the hopper and between the partitions of the receptacle to push the cigarettes out therefrom, vertically-movable doors adapted to partly or entirely close the openings in the end walls of the hopper, and means for conveying the cigarettes into the boxes, substantially as described.

18. An apparatus for packing cigarettes and other articles into boxes, comprising a holder for the boxes, a hopper adapted to receive the cigarettes and having openings in its end walls near the bottom thereof, a partitioned shaking receptacle into which the cigarettes are adapted to fall from the hopper, a comb-like plunger having sundry of its prongs or teeth made in superposed detachable sections, said teeth being adapted to pass between the partitions of the receptacle to push the cigarettes out therefrom, vertically-movable doors adapted to partly or entirely close the openings in the end walls of the hopper, said doors alining with those teeth of the plunger which are made in sections, and means for conveying the cigarettes into the boxes, substantially as described.

19. An apparatus for packing cigarettes and other articles into boxes, comprising a holder for the boxes, a hopper adapted to receive the cigarettes and having openings in its end walls near the bottom thereof, a partitioned shaking receptacle into which the cigarettes are adapted to fall from the hopper, a slide located above the receptacle and controlling the entrance of cigarettes into the same, and means for pushing the cigarettes out of said receptacle and into the boxes, substantially as described.

20. The combination of the mechanism for producing boxes having open ends, a conveyer or holder for said unfinished boxes, a device for alining cigarettes or like articles in regular rows, mechanism for pushing said alined cigarettes into the unfinished boxes, and a tucking device for closing the ends of the boxes, substantially as described.

21. The combination of the mechanism for producing boxes having open ends, a conveyer or holder for said unfinished boxes, the said holder being of less width than the boxes so that the box ends will protrude therefrom, mechanism for delivering cigarettes or other article into said boxes, and a tucking device located in the path of travel of the protruding box ends, to close them, substantially as described.

DOMINGO PEREZ Y BUÑOL.

Witnesses:
JNO. M. RITTER,
JOHN LOTKA.